(12) United States Patent
Maeda

(10) Patent No.: US 6,667,942 B2
(45) Date of Patent: Dec. 23, 2003

(54) LOADING DEVICE FOR OPTICAL DISK MEDIUM

(75) Inventor: Nobunari Maeda, Ohta (JP)

(73) Assignee: NEC Corporation, Tokyo (JP)

( * ) Notice: Subject to any disclaimer, the term of this patent is extended or adjusted under 35 U.S.C. 154(b) by 537 days.

(21) Appl. No.: 09/739,653

(22) Filed: Dec. 20, 2000

(65) Prior Publication Data

US 2001/0005349 A1 Jun. 28, 2001

(30) Foreign Application Priority Data

Dec. 27, 1999 (JP) ............................................ 11-370824

(51) Int. Cl.[7] ............................................... G11B 33/02
(52) U.S. Cl. ...................................................... 369/77.2
(58) Field of Search ................................. 369/77.2, 77.1, 369/75.1, 75.2, 30.85

(56) References Cited

U.S. PATENT DOCUMENTS

| | | | | |
|---|---|---|---|---|
| 5,128,918 A | * | 7/1992 | Suzuki et al. | 369/77.1 |
| 5,142,523 A | * | 8/1992 | Kamoshita | 369/75.2 |
| 5,301,176 A | * | 4/1994 | Kawachi et al. | 369/75.2 |
| 5,301,177 A | * | 4/1994 | Kumakura | 369/75.2 |
| 5,572,497 A | * | 11/1996 | Kim et al. | 369/77.2 |
| 5,914,929 A | * | 6/1999 | Kato et al. | 369/75.2 |
| 6,009,062 A | * | 12/1999 | Nashimoto et al. | 369/77.2 |
| 6,069,858 A | * | 5/2000 | Endo et al. | 369/75.1 |
| 6,097,686 A | * | 8/2000 | Yun | 369/75.2 |
| 6,288,982 B1 | * | 9/2001 | Kato | 369/30.36 |
| 6,292,452 B1 | * | 9/2001 | Endo et al. | 369/75.2 |
| 6,314,073 B2 | * | 11/2001 | Horie | 369/77.2 |

FOREIGN PATENT DOCUMENTS

| | | | | |
|---|---|---|---|---|
| JP | 01091361 A | * | 4/1989 | G11B/17/04 |
| JP | 06111443 A | * | 4/1994 | G11B/17/04 |
| JP | 8-147841 A | | 6/1996 | |
| JP | 9-245407 A | | 9/1997 | |
| JP | 11-296950 | | 10/1999 | |

* cited by examiner

Primary Examiner—William Korzuch
Assistant Examiner—C R Beacham
(74) Attorney, Agent, or Firm—Sughrue Mion, PLLC

(57) ABSTRACT

A loading device for an optical disk medium is described. The loading device includes a body; a pair of guiding rollers which guides an optical disk medium; an optical disk holder disposed further inside relative to the position of the guiding rollers for the insertion of the optical disk medium therein, the optical disk holder being capable of moving back and forth in the insertion direction of the optical disk medium; a reading mechanism; a clamper disposed above the optical disk medium, the clamper being capable of holding the optical disk medium between itself and the reading mechanism; and a driving mechanism which moves the optical disk holder in a straight line to a predetermined position in the body when the inserted optical disk medium is placed at a predetermined position of the optical disk holder while simultaneously moving the reading mechanism from its position underneath the optical disk holder toward the optical disk medium in order to hold the optical disk medium between the reading mechanism and the clamper.

11 Claims, 6 Drawing Sheets df# LOADING DEVICE FOR OPTICAL DISK MEDIUM

BACKGROUND OF THE INVENTION

1. Field of the Invention

The present invention relates to a loading device. More specifically, the present invention relates to a loading device for an optical disk medium.

2. Description of Related Art

A conventional loading device for an optical disk medium, particularly a device which loads/unloads media of various kinds such as a disc-shaped medium, for example, a compact disk (CD) and a cartridge type medium, for instance, a magneto-optical (MO) disk, has a mechanism for loading such media using a saucer-type member, generally called a tray, which is extended from the body of the device. After the medium is placed thereon, the tray is returned to the inside of the device to load the optical disk medium.

The length of the tray extended from the body of the device of this kind is substantially the same as the diameter of the medium or the length of the cartridge which contains the medium. Therefore, there is a possibility that the tray may collide with an object when the tray is extended. In order to avoid such a collision, a large amount of free space equivalent to the length of extension of the tray is required in front of the device. Also, since the amount of extension of the tray is considerably large, there is a danger that an external force may be applied to the tray which may damage or break the tray. If the tray is damaged, it may lead to a critical problem in the loading/unloading operation and, hence, it becomes difficult to maintain the initial operability of the optical disk loading device.

SUMMARY OF THE INVENTION

It is therefore an object of the present invention to provide a loading device for an optical disk medium whose internal mechanism cannot be damaged by an external force.

Another object of the present invention is to provide such an optical disk loading device which is capable of maintaining the initial operability thereof.

According to the device of the present invention which is a front loading system, i.e., one in which a medium is inserted into the front of the device, it is unlikely for an external force to be applied to the device since it does not have a member such as a tray which extends outside the device. As a result, there is no danger of damaging the internal mechanism of the device by an external force.

Accordingly, the present invention as set forth in claim 1 is a loading device for an optical disk medium, including: a body including an insertion opening through which an optical disk medium is inserted; a pair of guiding rollers disposed so as to extend in front of the insertion opening to guide the optical disk medium; an optical disk holder disposed further inside relative to the position of the guiding rollers for the insertion of the optical disk medium therein, the optical disk holder being capable of moving back and forth in the insertion direction of the optical disk medium; a reading mechanism disposed below the optical disk holder; a clamper disposed above the optical disk medium, the clamper being capable of holding the optical disk medium between itself and the reading mechanism; and a driving mechanism which parallelly moves the optical disk holder to a predetermined position in the body after the inserted optical disk medium is placed at a predetermined position on the optical disk holder while simultaneously moving the reading mechanism from its position underneath the optical disk holder toward the optical disk medium in order to hold the optical disk medium between the reading mechanism and the clamper.

The present invention as set forth in claim 2 is a loading device for an optical disk medium according to claim 1, wherein the clamper is rotatably attached to a clamper holder which is provided so as to be movable in a direction perpendicular to the insertion direction of the optical disk medium and urged in a direction away from the optical disk medium by an urging member which is disposed between the clamper holder and the optical disk holder so that the clamper holder is moved toward the optical disk medium by a cam member provided within the body when the optical disk holder is moved to the predetermined position.

The present invention as set forth in claim 3 is a loading device for an optical disk medium according to claim 1 or 2, wherein the optical disk medium is a compact disk; a disk guide, which guides the compact disk when a peripheral portion of the compact disk is inserted therein, is disposed on a side portion of the optical disk holder, the disk guide being attached in a movable manner with respect to the optical disk holder parallel to the face of the compact disk and urged in a direction toward the compact disk by an urging member; and the clamper holder moves the disk guide in a direction away from the compact disk when the clamper holder itself is moved in a direction toward the compact disk.

The present invention as set forth in claim 4 is a loading device for an optical disk medium according to claim 1 or 2, wherein the optical disk medium is a cartridge type medium having a medium contained in a square-shaped cartridge provided with a dust-proof shutter; the optical disk holder is a cartridge holder; and an engaging member elastically engaged with a concave portion which is disposed on both side portions of the cartridge type medium, is disposed on the inside of the cartridge holder.

The present invention as set forth in claim 5 is a loading device for an optical disk medium according to claim 4, further including: a shutter opening mechanism disposed between the engaging members, the shutter opening mechanism being engaged the dust-proof shutter of the cartridge type medium and opens the dust-proof shutter when actuated by the insertion of the cartridge type medium.

The present invention as set forth in claim 6 is a loading device for an optical disk medium according to claim 5, wherein the shutter opening mechanism includes: a guiding groove formed on a surface of the cartridge holder which is parallel to the cartridge type medium, the guiding groove may have an arched shape; a shutter lever attached to a surface of the cartridge holder to allow movement around the center of the arc of the guiding groove via the guiding groove, the shutter lever protruding toward the inside of the cartridge holder, to be engaged with the dust-proof shutter; and an urging member which urges the shutter lever toward an end portion of the guiding groove.

The present invention as set forth in claim 7 is a loading device for an optical disk medium according to claim 6, wherein the end portion of the guiding groove is positioned inside along the width of the cartridge holder with respect to a straight line parallel to the insertion direction of the cartridge type medium which passes through the rotation center of the shutter lever; and the other end portion of the guiding groove is positioned further inside relative to the end portion of the groove at the back of the cartridge holder.

The present invention as set forth in claim 8 is a loading device for an optical disk medium according to claim 1 or 2, wherein the optical disk medium to be inserted in the body is one of a compact disk and a cartridge type medium; the optical disk holder is a cartridge holder; and the pair of guiding rollers are provided so as to be capable of both approaching and separating to/from each other; and the loading device further including: a disk guide which guides the compact disk when a peripheral portion of the compact disk is inserted therein, the disk guide being disposed on the cartridge holder in a movable manner with respect to the optical disk holder parallel to the face of the compact disk, and urged in a direction toward the compact disk by an urging member; a shutter opening mechanism disposed on the cartridge holder, the shutter opening mechanism being engaging, upon the insertion of the cartridge type medium, a dust-proof shutter of the cartridge type medium to open the dust-proof shutter; and wherein the clamper holder moves the disk guide in a direction away from the compact disk when the clamper holder itself is moved in a direction toward the compact disk and, when the cartridge type medium is inserted, the inserted cartridge type medium pushes and moves the disk guide.

The present invention as set forth in claim 9 is a loading device for an optical disk medium according to claim 8, further including: a lever provided with the cartridge holder in the insertion direction of the optical disk medium, the lever being attached to the body at the midsection of the lever in a pivotal manner, and a moving plate, including a shutter opening mechanism, the moving plate being rotatably attached to an end portion of the lever and the moving plate also being slidably engaged with the end portion of the lever in the insertion direction of the optical disk medium, and wherein one of the pair of guiding rollers is attached to the other end portion of the lever; the shutter opening mechanism is moved inside the cartridge holder by the pivotal motion of the lever when the pair of guiding rollers are separated from each other by the insertion of the cartridge type medium; and the shutter opening mechanism is moved toward the vicinity of the inside surface of the cartridge holder due to the pivotal motion of the lever when the pair of guiding rollers are closest to each other during the insertion of the compact disk.

The present invention as set forth in claim 10 is a loading device for an optical disk medium according to claim 9, wherein the shutter opening mechanism includes: a guiding groove formed on the moving plate, the guiding groove may have an arched shape; a shutter lever attached to a surface of the moving plate to allow movement around the center of the arc of the guiding groove, the shutter lever protruding toward the inside of the cartridge holder to engage the dust-proof shutter; and an urging member which urges the shutter lever toward an end portion of the guiding groove.

The present invention as set forth in claim 11 is a loading device for an optical disk medium according to claim 10, wherein the end portion of the guiding groove is positioned inside along the width of the cartridge holder with respect to a straight line parallel to the insertion direction of the cartridge type medium which passes through the rotation center of the shutter lever; and the other end portion of the guiding groove is positioned further inside relative to the end portion of the groove at the back of the cartridge holder.

According to the present invention mentioned above, since there is no member which protrudes outside the device, when a loading/unloading operation for a compact disk or cartridge type medium is carried out, it becomes possible to prevent the accidental application of an external force to the internal mechanism of the device and to avoid a damage thereto. Accordingly, the level of the initial functionality of the device may be maintained for a long period of time.

Also, both the compact disk and the cartridge type medium can be loaded using a single device by adapting a structure in which the CD holder or the shutter opening mechanism is movable.

DETAILED DESCRIPTION OF THE INVENTION

Figure 1:
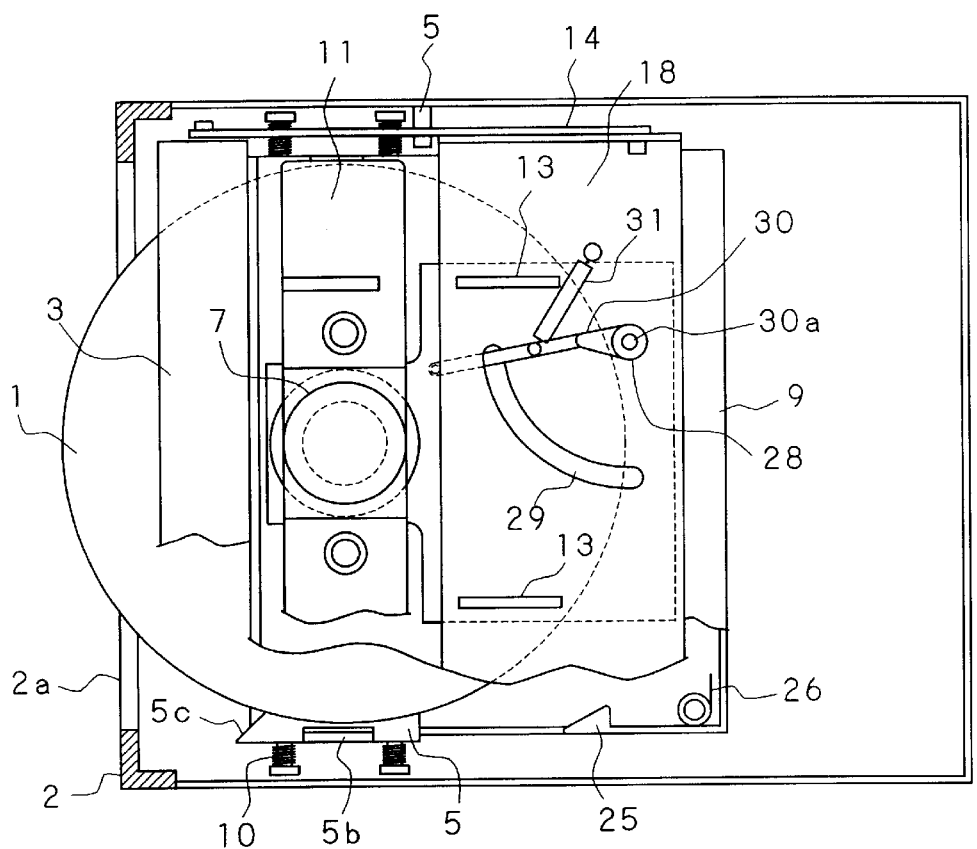
FIG. 1 is a plan view of a loading device for an optical disk medium according to a first embodiment of the present invention showing the main parts thereof.

Hereinafter, embodiments of the present invention will be described in detail with reference to the attached drawings.

In an embodiment of the present invention, the loading device for an optical disk medium of the present invention has the following basic components: a body 2, a pair of guiding rollers 3 and 4, an optical disk holder 5 (hereinafter also referred to as a CD holder), a reading mechanism 6, a clamper 7, and a driving mechanism 8. The body 2 includes an insertion opening 2a through which a compact disk (i.e., a CD 1) is inserted. The pair of guiding rollers 3 and 4 are placed so as to extend in front of the insertion opening 2a to guide the CD 1. The optical disk holder 5 (CD holder 5) is disposed so as to be located further inside relative to the position of the guiding rollers 3 and 4. When the CD 1 is inserted, the CD holder 5 may be moved back and forth in the insertion direction of the CD 1. The reading mechanism 6 is disposed below the CD holder 5. The clamper 7 is disposed above the CD holder 5 and holds the CD 1 between itself and the reading mechanism 6. When the CD 1 is inserted and placed at a predetermined position on the CD holder 5, the driving mechanism 8 moves the CD holder 5 in a straight to a predetermined position in the body 2 while simultaneously moving the reading mechanism 6 from its position underneath the CD holder 5 toward the CD holder 5 in order to hold the CD 1 between the reading mechanism 6 and the clamper 7.

Figure 5:
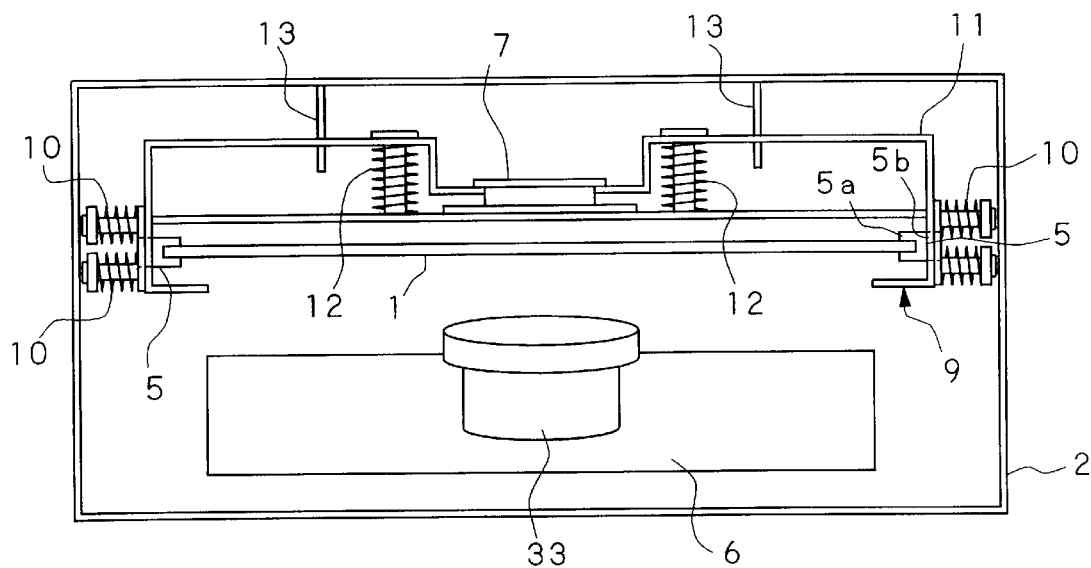
FIG. 5 is a diagram showing a longitudinal cross-section of the main parts of the device for explaining the operation of the device according to the first embodiment of the present invention.
Figure 6:
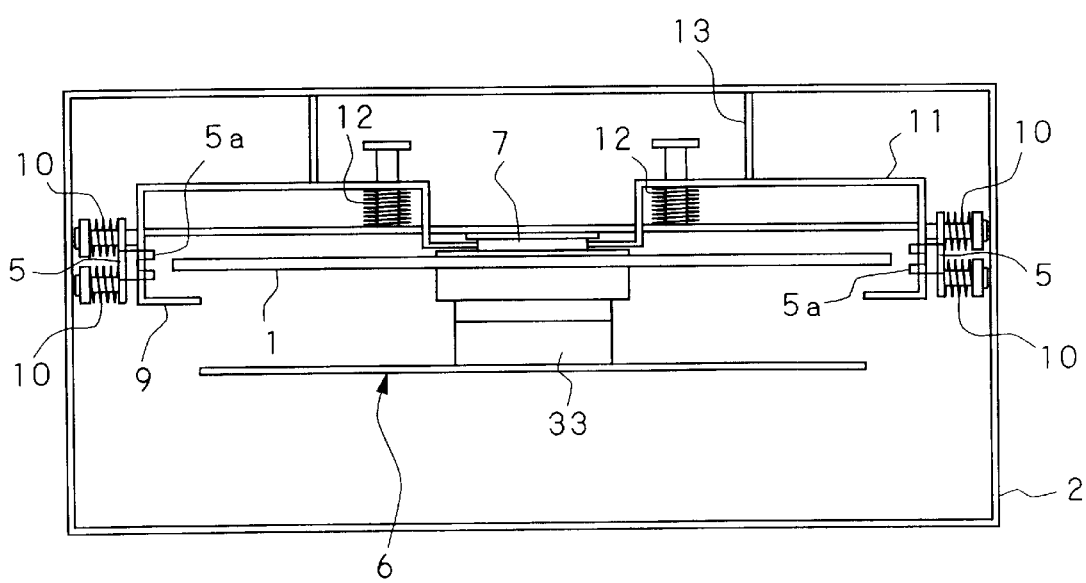
FIG. 6 is a diagram showing a longitudinal cross-sectional view of the main parts of the device for explaining the operation of the device according to the first embodiment of the present invention.

More specifically, as shown in FIGS. 5 and 6, a CD holder 5 is disposed on each side of a cartridge holder 9 having a substantially box shape which is attached so as to be capable of reciprocating (i.e., moving back and forth) in the insertion direction of the CD 1. Each of the CD holders 5 is disposed so as to protrude toward the inside of the cartridge holder 9.

Also, each of the CD holders 5 is urged toward a predetermined position inside the cartridge holder 9 by its respective spring 10 and, as shown in FIG. 6, a respective groove portion 5a in which a peripheral portion of the CD 1 is inserted, is formed on the inside surface of the cartridge holder 9. A disk guide for holding the CD 1 is formed by the groove portion 5a.

The clamper 7 is rotatably attached to a clamper holder 11 which is provided so as to move in a direction perpendicular to the insertion direction of the CD 1 (the vertical direction in the figure) and is urged in a direction opposite the cartridge holder 9 by its respective spring 12 which is disposed between the clamper holder 11 and the cartridge holder 9, so that the clamper holder 11 is moved toward the optical disk medium by a cam member 13 which is provided with the body 2 when the CD holder 5 is moved to the predetermined position together with the cartridge holder 9.

A surface which tapers toward the cartridge holder 9 is formed on the portion of the cam member 13 which is opposite the insertion opening 2a. Accordingly, due to the presence of the tapered surface, as the cartridge holder 9 is moved toward the inside of the body 2, the clamper holder 11 is moved toward the cartridge holder 9 due to the restoring force of the spring 12. In this manner the clamper 7 is moved toward the CD 1.

Also, a tapered surface 5b is formed at a position opposite the clamper holder 11 so that as the CD holder 5 is moved, it is gradually placed inside the cartridge holder 9. Accordingly, when the clamper holders 11 are moved toward the cartridge holder 9, both of the clamper holders 11 are pushed open by the sliding of each end portion thereof.

Moreover, a lever 14 is attached in a rotatable manner on a surface extending in the insertion direction of the CD 1 and perpendicular to the surface of the CD 1. The lever 14 is pivotally attached to the body 2 at the lever's midsection by a shaft 15. A movable plate 18 is attached to one end of the lever 14 by a pin 17. Further, the guiding roller 3 is rotatably attached to the other end of the lever 14. In addition, the lever 14 is pushed by a torsion spring 19, which is disposed around the shaft 15, so that the guiding roller 3 moves toward the guiding roller 4.

Also, a guiding groove 20 is formed in the insertion direction of the CD 1, at the position where the moving plate 18 engages with the pin 17, so that the moving plate 18 may be moved together with the cartridge holder 9.

Figure 2:
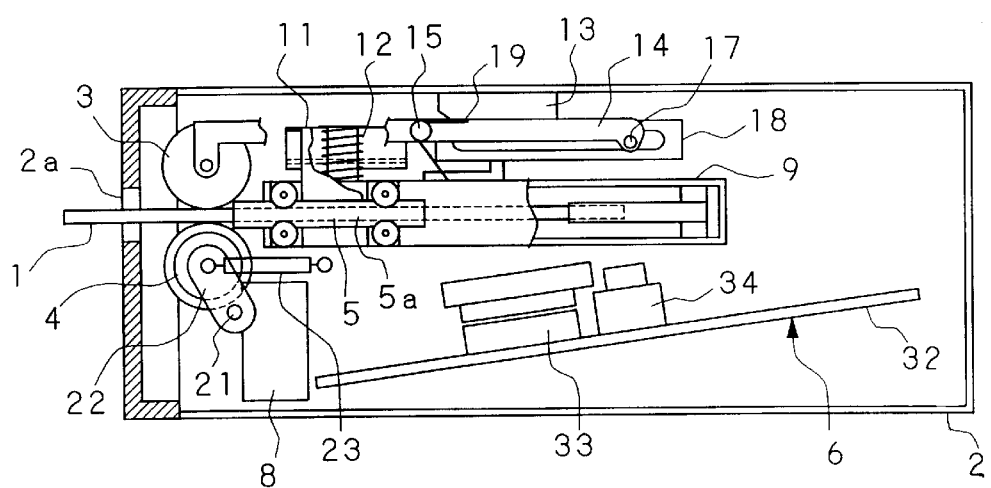
FIG. 2 is a diagram showing a longitudinal cross-section of the main parts of the device according to the first embodiment of the present invention.

On the other hand, as shown in FIG. 2, the guiding roller 4 is pivotally attached to a shaft 21, which is fixed to the body 2 in a rotatable manner around an axis thereof, by a lever 22. Also, the lever 22 is urged by a tension spring 23 placed between the lever 22 and the body 2 so that the guiding roller 4 is pulled toward the guiding roller 3.

Moreover, in this embodiment, it is assumed that the optical disk medium to be inserted in the device is a cartridge type medium (hereinafter referred to as MO 24) having a dust-proof shutter 27 in which a medium is contained in a square-shape cartridge such as an MO and a mechanism which satisfies this assumption is provided.

That is, a tapered guiding surface 5c increasing in width along the insertion direction is formed, with respect to the insertion direction, on the front portion of the CD holders 5 which are provided on both sides of the cartridge holder 9. Accordingly, when the MO 24 is inserted into the cartridge holder 9, both of the CD holders 5 are pushed open by the MO 24 to allow passage for the MO 24.

Figure 7:
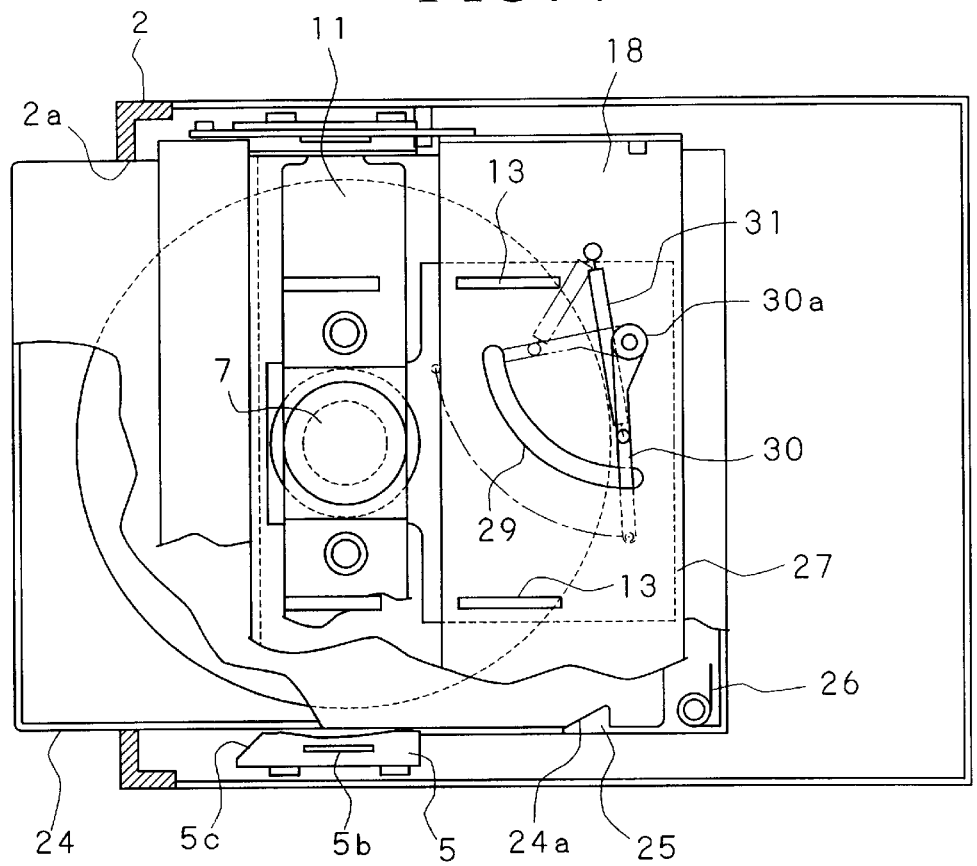
FIG. 7 is a plan view of a loading device for an optical disk medium according to a second embodiment of the present invention showing the main parts thereof.
Figure 8:
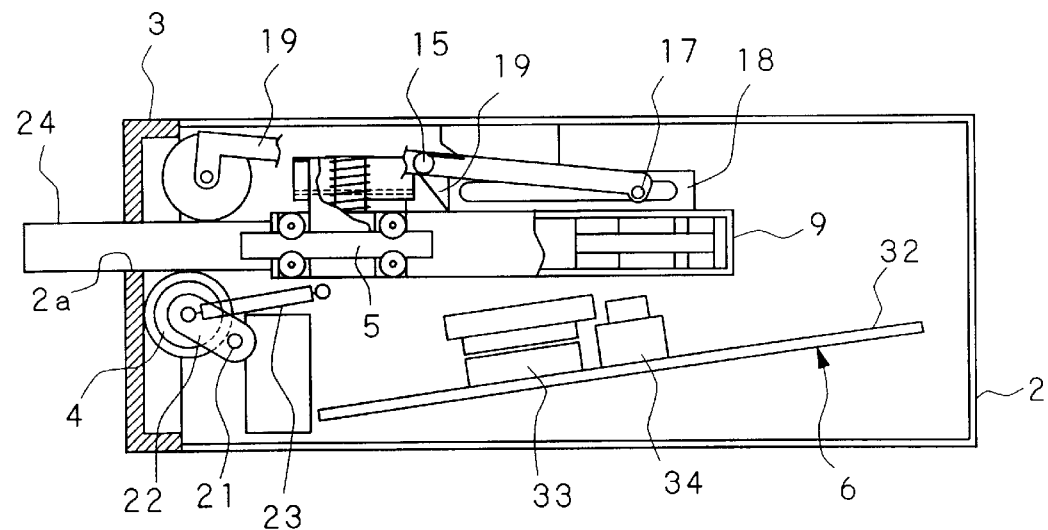
FIG. 8 is a diagram showing a longitudinal cross-section of the main parts of the device according to the second embodiment of the present invention.
Figure 9:
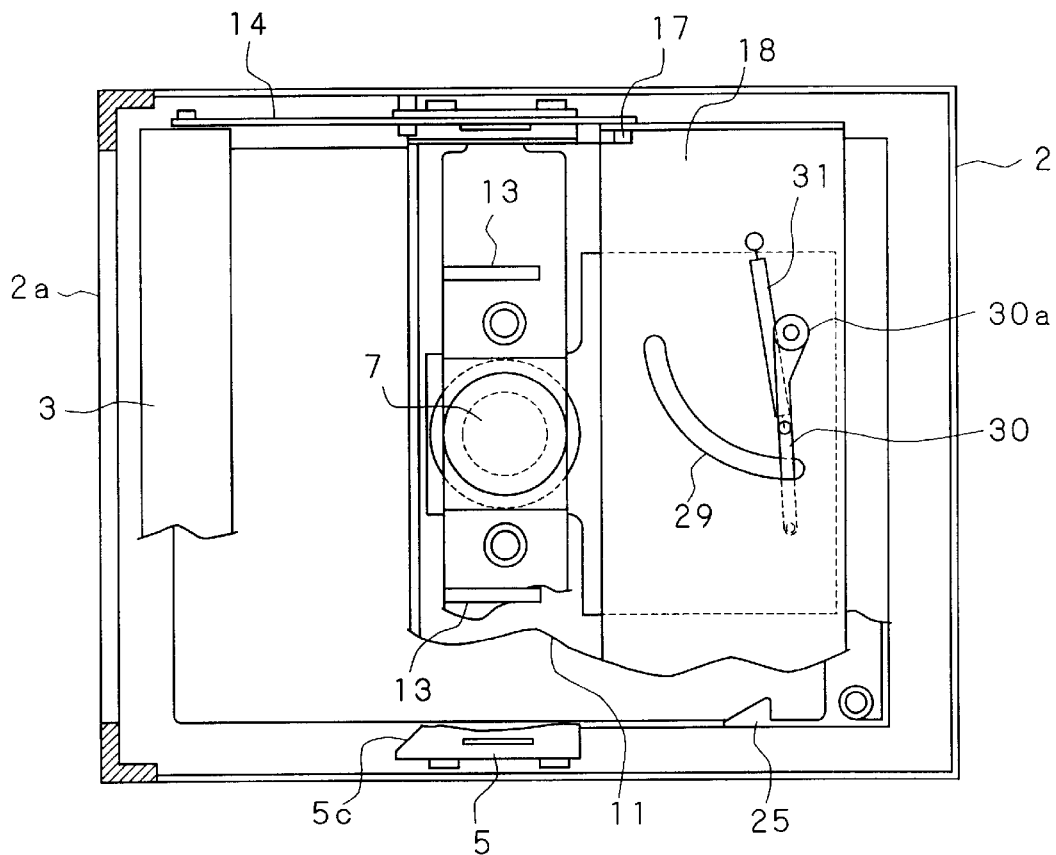
FIG. 9 is a plan view of the main parts of the device for explaining an operation of the device according to the second embodiment of the present invention.

Also, as shown in FIG. 7, an engaging member 25 which is elastically engaged with a concave portion 24a (only one is shown in the figure), is formed on both sides of the MO 24 and is disposed on the back of both sides of the cartridge holder 9. The engaging member 25 is pushed toward the inside of the cartridge holder 9 by the action of a spring 26 and rotates so as to be pushed open when the MO 24 is inserted. Also, when superposed on the concave portions 24a, the engaging member 25 engages the concave portion 24a to hold the MO 24.

Moreover, a shutter opening mechanism 28 for opening the dust-proof shutter 27, which is actuated when the MO 24 is inserted by engaging the dust-proof shutter 27 provided with the MO 24, is disposed at the back of the cartridge holder 9 between the engaging members 25.

As shown in FIG. 1, the shutter opening mechanism 28 includes a guiding groove 29, a shutter lever 30, and an urging member. The guiding groove 29 has an arched shape and is formed on the moving plate 18. The shutter lever 30 is attached to the surface of the moving plate 18 to allow movement around the center of the arc of the guiding groove 29 and protrudes toward the inside of the cartridge holder 9 to engage the dust-proof shutter 27. The urging member urges the shutter lever 30 toward an end portion of the guiding groove 29. One end (hereinafter referred to as the first end) of the guiding groove 29 is positioned inside along the width of the cartridge holder 9 with respect to a straight line parallel to the insertion direction of the MO 24 which passes through the rotation center 30a of the shutter lever 30. Also, the other end (hereinafter referred to as the second end) of the guiding groove 29 is positioned further inside relative to the first end of the groove 29 at the back of the cartridge holder 9. A spring 31 which pushes the shutter lever 30 toward the first end of the guiding groove 29 is provided with the shutter lever 30.

The reading mechanism 6 has a substrate 32, a spindle motor 33 and an optical head 34 for reading information from a medium. The spindle motor 33 is attached to the substrate 32 and makes contact with the rotation center of an optical disk medium, such as the CD 1 or the MO 24, which is inserted in the body 2 so as to hold the center of the optical disk medium between itself and the clamper 7 and rotates the medium.

Then, when the CD 1 or the MO 24 is moved between predetermined positions, the substrate 32 is moved toward the cartridge holder 9 by the driving mechanism 8 so as to keep the rotation center of the optical disk medium, such as the CD 1 or the MO 24, between itself and the clamper 7 as mentioned above.

Next, a mechanism of the embodiment of the present invention having the above-mentioned structure will be described.

First, a case wherein the optical disk medium to be inserted is the CD 1 will be described.

Figure 3:
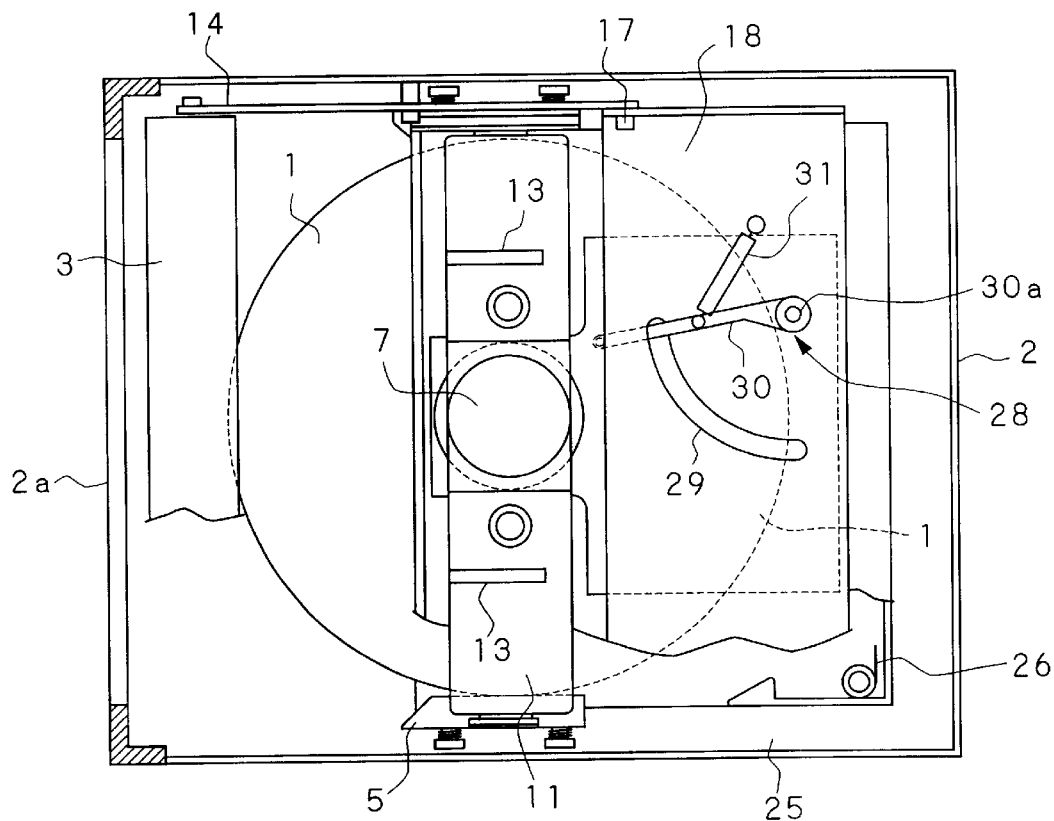
FIG. 3 is a plan view of the main parts of the device for explaining the operation of the device according to the first embodiment of the present invention.

When the CD 1 is inserted, it is guided to the body 2 by the guiding rollers 3 and 4 and the peripheral portion thereof is supported by both of the CD holders 5 at two points (refer to FIGS. 1, 2, and 3).

The above-mentioned insertion procedure is initiated by a user.

When the CD 1 is inserted into the body 2 in a position where it can be supported by the CD holder 5, the insertion position of the CD 1 is detected by a detection means (not shown in the figures), and the driving mechanism 8 is actuated based on the detection result.

After the actuation of the driving mechanism 8, the cartridge holder 9 is moved in a straight line toward the back of the body 2.

As the movement of the cartridge holder 9 proceeds, the clamper holder 1, which is pushed by the cam member 13, is moved toward the cartridge holder 9. Accordingly, both clampers 7 are gradually opened by the clamper holder 11.

Figure 4:
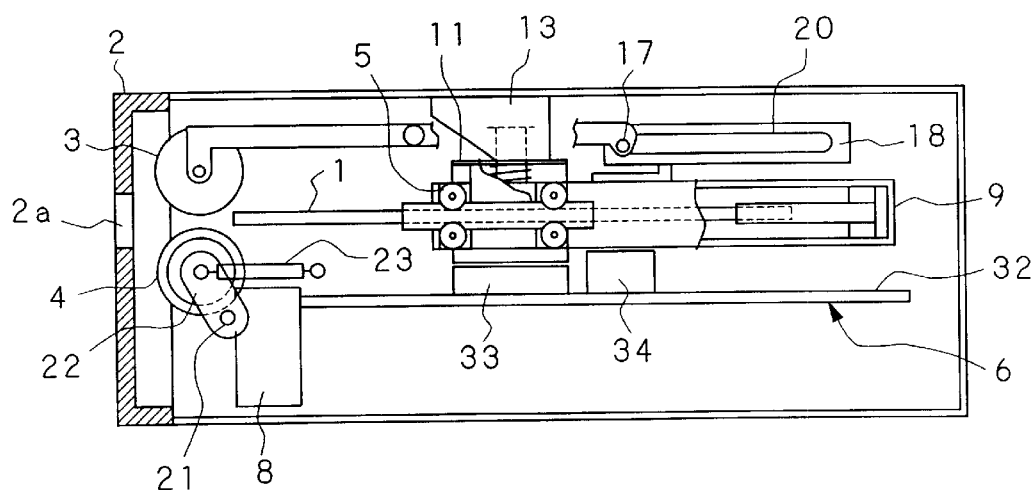
FIG. 4 is a diagram showing a longitudinal cross-section of the main parts of the device for explaining the operation of the device according to the first embodiment of the present invention.

In synchronization with the above movement of the cartridge holder 9, the reading mechanism 6 is gradually moved toward the cartridge holder 9. When the cartridge holder 9 is moved in a straight line to a predetermined position, the clampers 7 release the CD 1 and the rotation center of the CD 1 is held by the clamper 7 and the spindle motor 33 (refer to FIGS. 3, 4, and 6.)

At this point, a positional detection is carried out by a detection means (not shown in the figures) and the movements of the cartridge holder 9 and the reading mechanism 6 are stopped.

In this state, the CD 1 is rotated by the spindle motor 33 and a reading operation is performed by the reading mechanism 6.

When an ejection operation for the CD 1 is performed, an ejector switch (not shown in the figures) is operated so that the CD 1 is conveyed to a position where a portion thereof is projected from the insertion opening 2a by the reverse procedure, when compared with the insertion procedure; this operation is carried out by the driving mechanism 8.

The user can remove the CD 1 from the device by grasping and pulling the projecting portion of the CD 1.

As for the insertion operation of the CD 1, since the CD 1 is thin, the guiding rollers 3 and 4 are disposed so as to be close to each other so that the angular displacement of the lever 14 attached to the guiding roller 3 becomes small. Accordingly, the moving plate 18 is positioned away from the cartridge holder 9 so that the shutter lever 30 attached to the moving plate 18 recedes toward the side surface of the cartridge holder 9. For this reason, interference with the CD 1 which is inserted in the cartridge holder 9 can be avoided.

According to the present invention, therefore, as for the insertion and ejection operations of the CD 1, there is no need to have a member such as a tray which protrudes from the body of the device. As a result, there is no chance that an external force will be accidentally applied to the internal mechanism of the device, and, hence, damage to the internal mechanism can be prevented.

Next, a case wherein the optical disk medium to be inserted is the MO 24 will be described.

As shown in FIG. 7, when the MO 24 is inserted, the CD holder 5 is pushed open by both side surfaces of the MO 24 during the middle of the insertion operation and allows the further insertion of the MO 24.

Since the MO 24 is thick, the guiding rollers 3 and 4 are moved so as to be pushed open, and the lever 14 is rotated so as to move the moving plate 18 toward the cartridge holder 9. Accordingly, the shutter lever 30 provided with the moving plate 18 is positioned at the front in the insertion direction of the MO 24.

As the MO 24 is further inserted, the shutter lever 30 engages the dust-proof shutter 27 and, as the insertion of the MO 24 further proceeds, the shutter lever 30 pivots toward the back of the cartridge holder 9 along the guiding groove 29 formed on the side surface thereof.

Figure 11:
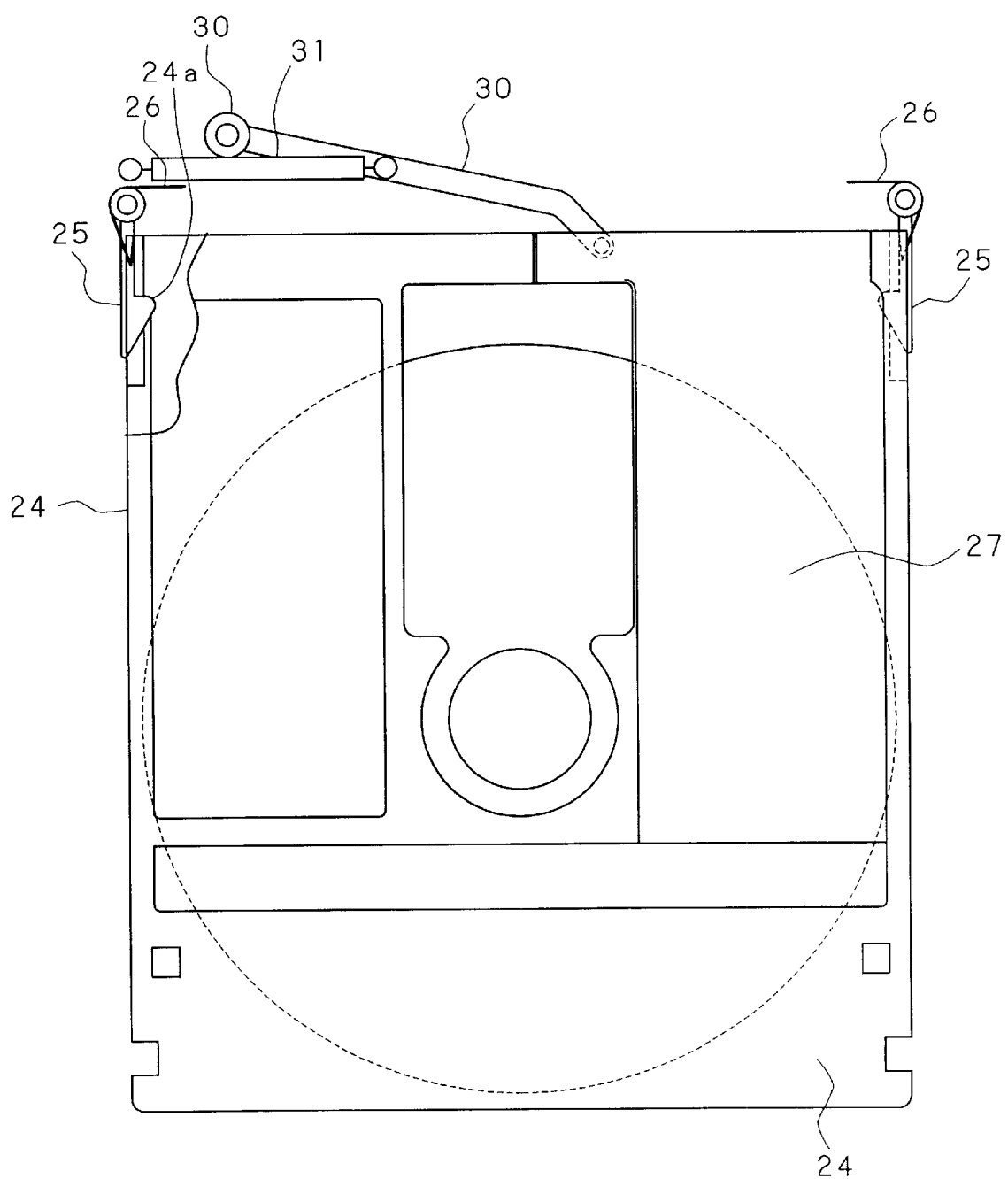
FIG. 11 is a schematic plane view of the device showing a cartridge type medium inserted in a predetermined position of the device according to the second embodiment of the present invention.

In this manner, the dust-proof shutter 27 engaged with the shutter lever 30 is gradually opened and, when the MO 24 is inserted into a predetermined position of the cartridge holder 9, the dust-proof shutter 27 becomes completely opened as shown in FIG. 11.

Also, when the dust-proof shutter 27 is completely opened, the engaging members 25 disposed on each side of the cartridge holder 9 are engaged with the concave portions 24a formed on the respective sides of the MO 24 as shown in FIG. 11, and the MO 24 is secured at the predetermined position of the cartridge holder 9.

Figure 10:
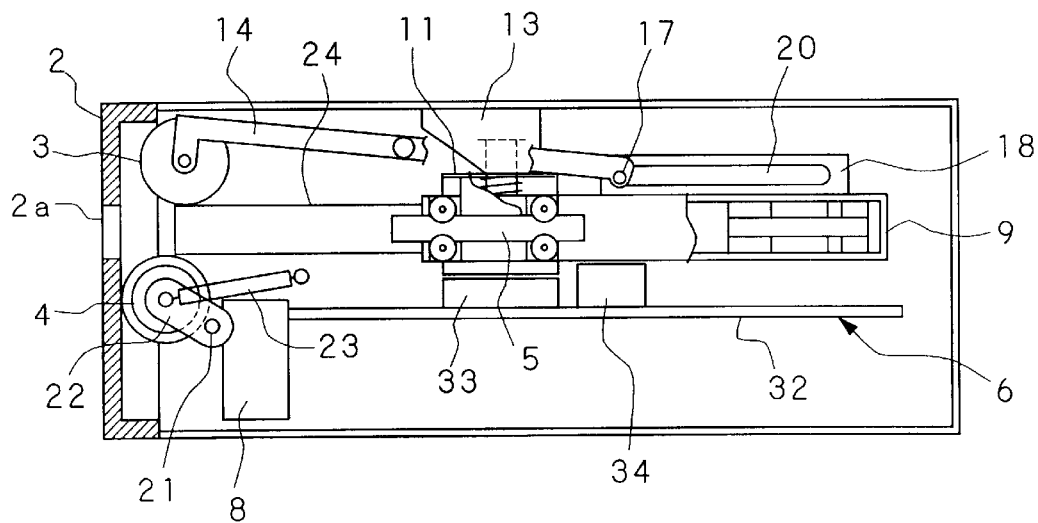
FIG. 10 is a diagram showing a longitudinal cross-section of the main parts of the device for explaining the operation of the device according to the second embodiment of the present invention.

When the MO 24 is inserted into the predetermined position in this manner by a user, the insertion position thereof is detected by using a suitable detection means and, based on the detection results, as in the previously mentioned embodiment, the cartridge holder 9 is moved in a straight line toward the back of the body 2, and the clampers 7 are moved toward the cartridge holder 9. Also, the reading mechanism 6 is moved toward the cartridge holder 9 and, when the cartridge holder 9 is moved to the predetermined position, the optical disk medium contained in the MO 24 is held between the clamper 7 and the spindle motor 33, as shown in FIG. 10, in order to be read by an appropriate means.

When the MO 24 is ejected, the driving mechanism 8 is actuated in the reverse direction to return the MO 24 to the insertion position as shown in FIG. 7 and then the MO 24 is manually pulled by the user.

As also described above for the insertion and ejection operation of the CD 1, since there are no parts which protrude from the body 2, it is possible to avoid the accidental application of an external force to the internal mechanism, and damage to the internal mechanism of the device may be prevented.

Moreover, as described above, it becomes possible to handle both the CD 1 which is thin, and the MO 24 of a cartridge type which is thick, by using the CD holders 5 and the shutter opening mechanism 28, both of which are movable, together with the engaging members 25.

Note that the shape and the size of each structural component described in the above embodiments are only examples and may be varied or modified based on such factors as design requirements.

For instance, it is possible to adapt a structure which is only applicable to either the CD 1 or the MO 24.

In the former case, the shutter opening mechanism 28 and moving mechanisms become unnecessary and, in the latter case, the CD holders 5 are not required.

What is claimed is:

1. A loading device for an optical disk medium, comprising:

a body including an insertion opening through which an optical disk medium is inserted;

a pair of guiding rollers disposed so as to extend along said insertion opening to guide an optical disk medium;

an optical disk holder disposed further inside relative to the position of said guiding rollers for the insertion of the optical disk medium therein, said optical disk holder being capable of moving back and forth in the insertion direction of the optical disk medium;

a reading mechanism disposed below said optical disk holder;

a clamper disposed above the optical disk medium, said clamper being capable of holding the optical disk medium between itself and said reading mechanism; and a driving mechanism which moves said optical disk holder to a predetermined position in said body when the inserted optical disk medium is placed at a predetermined position on said optical disk holder, while moving said reading mechanism from its position underneath said optical disk holder toward the optical disk medium, in order to hold the optical disk medium between said reading mechanism and said clamper.

2. A loading device for an optical disk medium according to claim 1, wherein said clamper is rotatably attached to a clamper holder which is provided so as to be movable in a direction perpendicular to the insertion direction of the optical disk medium and urged in a direction away from the optical disk medium by an urging member which is disposed between said clamper holder and said optical disk holder so that said clamper holder is moved toward the optical disk medium by a cam member provided within said body when said optical disk holder is moved to a predetermined position.

3. A loading device for an optical disk medium according to claim 1 or 2, wherein the optical disk medium is a compact disk;

a disk guide, which guides the compact disk when a peripheral portion of the compact disk is inserted therein, is disposed on a side portion of said optical disk holder, said disk guide being attached in a movable manner with respect to said optical disk holder parallel to the face of the compact disk and urged in a direction toward the compact disk by an urging member; and said clamper holder moves said disk guide in a direction away from the compact disk when said clamper holder itself is moved in a direction toward the compact disk.

4. A loading device for an optical disk medium according to claim 1 or 2, wherein the optical disk medium is a cartridge type medium having a medium contained in a square-shaped cartridge provided with a dust-proof shutter;

said optical disk holder is a cartridge holder; and an engaging member elastically engaged with a concave portion which is disposed on both side portions of the cartridge type medium, is disposed on the inside of said cartridge holder.

5. A loading device for an optical disk medium according to claim 4, further comprising:

a shutter opening mechanism disposed between said engaging members, said shutter opening mechanism engages the dust-proof shutter of the cartridge type medium and opens the dust-proof shutter when actuated by the insertion of the cartridge type medium.

6. A loading device for an optical disk medium according to claim 5, wherein said shutter opening mechanism comprises:

a guiding groove formed on a surface of said cartridge holder which is parallel to the cartridge type medium, said guiding groove may have an arched shape;

a shutter lever attached to a surface of said cartridge holder to allow movement around the center of the arc of said guiding groove via said guiding groove, said shutter lever protruding toward the inside of said cartridge holder and engaging with said dust-proof shutter; and an urging member which urges said shutter lever toward an end portion of said guiding groove.

7. A loading device for an optical disk medium according to claim 6, wherein said end portion of said guiding groove is positioned inside along the width of said cartridge holder with respect to a straight line parallel to the insertion direction of the cartridge type medium and which passes through the rotation center of said shutter lever; and the other end portion of said guiding groove is positioned further inside relative to the end portion of said groove at the back of said cartridge holder.

8. A loading device for an optical disk medium according to claim 1 or 2, wherein the optical disk medium to be inserted in said body is one of a compact disk and a cartridge type medium;

said optical disk holder is a cartridge holder; and said pair of guiding rollers is provided so that the guiding rollers are capable of approaching and separating from each other, said loading device further comprising:

a disk guide which guides the compact disk when a peripheral portion of the compact disk is inserted therein, said disk guide being disposed on said cartridge holder in a movable manner with respect to said optical disk holder parallel to the face of the compact disk and urged in a direction toward the compact disk by an urging member; and a shutter opening mechanism disposed on said cartridge holder, said shutter opening mechanism engaging, upon the insertion of the cartridge type medium, a dust-proof shutter of the cartridge type medium to open the dust-proof shutter; wherein said clamper holder moves said disk guide in a direction away from the compact disk when said clamper holder itself is moved in a direction toward the compact disk and, when the cartridge type medium is inserted, the inserted cartridge type medium pushes and moves said disk guide.

9. A loading device for an optical disk medium according to claim 8, further comprising:

a lever provided with said cartridge holder in the insertion direction of the optical disk medium, said lever being attached to said body at the midsection of said lever in a pivotal manner, and a moving plate including said shutter opening mechanism, said moving plate being rotatably attached to an end portion of said lever and said moving plate also being slidably engaged with the end portion of said lever in the insertion direction of the optical disk medium, wherein one of said pair of guiding rollers is attached to the other end portion of said lever;

said shutter opening mechanism is moved inside said cartridge holder by the pivotal motion of said lever when said pair of guiding rollers are separated from each other by the insertion of the cartridge type medium; and said shutter opening mechanism withdraws toward the vicinity of the inside surface of said cartridge holder due to the pivotal motion of said lever when said pair of guiding rollers are closest to each other during the insertion of the compact disk.

10. A loading device for an optical disk medium according to claim 9, wherein said shutter opening mechanism comprises:

a guiding groove formed on said moving plate, said guiding groove may have an arched shape;

a shutter lever attached to a surface of said moving plate to allow movement around the center of the arc of said guiding groove, said shutter lever protrudes toward the inside of said cartridge holder to engage said dust-proof shutter; and an urging member which urges said shutter lever toward an end portion of said guiding groove.

11. A loading device for an optical disk medium according to claim 10, wherein the end portion of said guiding groove is positioned inside along the width of said cartridge holder with respect to a straight line parallel to the insertion direction of the cartridge type medium and which passes through the rotation center of said shutter lever; and the other end portion of said guiding groove is positioned further inside relative to the end portion of said groove at the back of said cartridge holder.

* * * * *